US011391573B2

(12) United States Patent
Sung et al.

(10) Patent No.: US 11,391,573 B2
(45) Date of Patent: Jul. 19, 2022

(54) OBJECT LOCATION TRACKING

(71) Applicant: Verizon Patent and Licensing Inc., Arlington, VA (US)

(72) Inventors: Kyle C. Sung, Austin, TX (US); Rolando Gonzalez, Austin, TX (US); Lei Lin, Magnolia, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 234 days.

(21) Appl. No.: 16/284,433

(22) Filed: Feb. 25, 2019

(65) Prior Publication Data

US 2020/0271452 A1    Aug. 27, 2020

(51) Int. Cl.
*G01C 21/28* (2006.01)
*G01C 21/34* (2006.01)

(52) U.S. Cl.
CPC ......... *G01C 21/28* (2013.01); *G01C 21/3446* (2013.01)

(58) Field of Classification Search
CPC .... G01C 21/28; G01C 21/00; G01C 21/3446; G01C 21/3407
USPC ...................................................... 701/417
See application file for complete search history.

(56) References Cited

U.S. PATENT DOCUMENTS

| 8,521,425 | B2* | 8/2013 | Sakata | G09B 29/106 |
| | | | | 701/527 |
| 8,825,378 | B2* | 9/2014 | Ashton | G07C 5/0816 |
| | | | | 701/417 |
| 2007/0299603 | A1* | 12/2007 | Kirby | G01C 21/28 |
| | | | | 701/408 |
| 2015/0106011 | A1* | 4/2015 | Nesbitt | G01C 21/3476 |
| | | | | 701/417 |
| 2016/0375901 | A1* | 12/2016 | Di Cairano | G01C 21/34 |
| | | | | 701/26 |
| 2017/0066445 | A1* | 3/2017 | Habu | B60W 30/165 |
| 2018/0100746 | A1* | 4/2018 | Jenkins | G01F 9/008 |
| 2018/0322431 | A1* | 11/2018 | Folck | G01S 19/51 |

* cited by examiner

*Primary Examiner* — Elaine Gort
*Assistant Examiner* — Matthias S Weisfeld

(57) ABSTRACT

A tracking device can monitor a movement of an object. The tracking device can detect a deviation in the movement of the object and can generate a data set based on detecting the deviation in the movement of the object. The data set can relate to a location of the object. The tracking device can update a model with the data set. The model can provide an estimated path of the movement of the object over a time period based on a plurality of data sets. The tracking device can transmit the model to a device. The device can use the model to determine a particular location of the object during the time period.

20 Claims, 6 Drawing Sheets

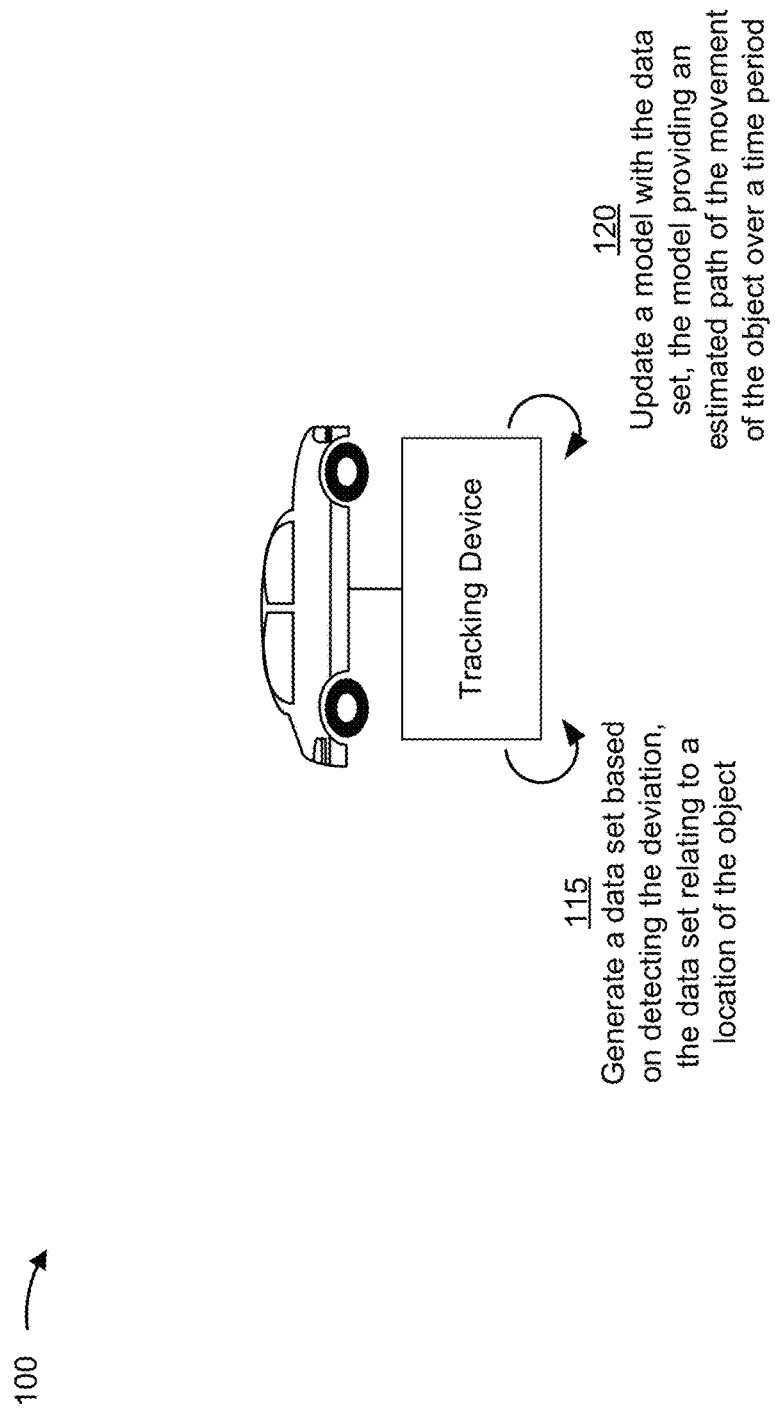

OBJECT LOCATION TRACKING

BACKGROUND

Object location tracking is used to monitor the location, movement, and/or behavior of an object. Object location tracking can be achieved through a tracking device, associated with the object, that can include a global positioning system (GPS) receiver and an electronic device capable of wireless communication. Data provided by the GPS can be transmitted to a remotely-located device by wireless communication to permit the remotely-located device to track the object.

BRIEF DESCRIPTION OF THE DRAWINGS

FIGS. 1A-1C are diagrams of one or more example implementations described herein.

DETAILED DESCRIPTION OF PREFERRED EMBODIMENTS

Figure 1A:
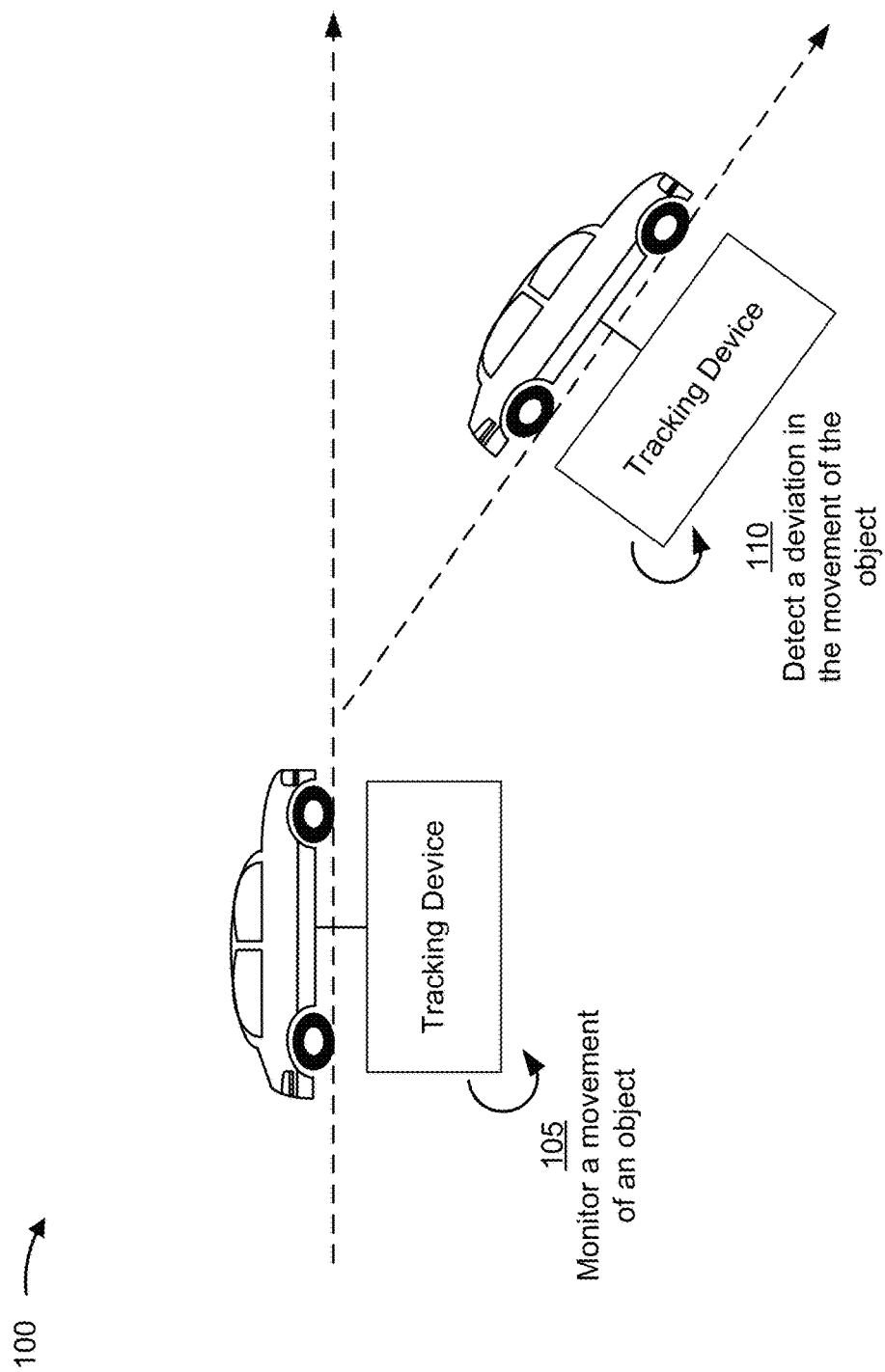

The following detailed description of example implementations refers to the accompanying drawings. The same reference numbers in different drawings can identify the same or similar elements.

Object location tracking (e.g., vehicle location tracking) can provide a location of an object to an owner of the object or a custodian of the object that is remotely located from the object. Current approaches to object location tracking involve the use of a tracking device that can include a GPS receiver and a wireless communication interface. The tracking device can be installed in, or provided in association with, an object that is to be tracked. The tracking device can transmit information relating to a location of the object (e.g., GPS information) to a remotely-located device to permit the remotely-located device to track the object. For example, the tracking device can be configured to transmit the information relating to the location of the object to the remotely-located device at regular, short intervals (e.g., every 5 seconds, every 30 seconds, etc.).

However, object location tracking performed in this manner can use significant computing resources and/or network resources associated with frequent data transmissions from the tracking device to the remotely-located device. In addition, the frequent data transmissions can cause network congestion and/or cause the remotely-located device to be overworked and fail, thereby resulting in inaccurate tracking due to delays and/or losses in incoming data from the tracking device. Furthermore, the data transmission intervals used by current object location tracking techniques can lack a level of precision that is necessary to determine a path taken by an object (e.g., unknown intermediate locations of the object between data transmissions of known locations of the object), thereby resulting in inaccurate tracking. As a consequence, computing resources (e.g., processing resources, memory resources, and/or the like) and/or network resources can be wasted identifying and correcting inaccurate location data. Furthermore, in an example of vehicle location tracking, inaccurate location data can cause numerous logistical issues, such as lost or delayed deliveries, inaccurate fuel level estimates, inaccurate mileage estimates, and/or the like.

Some implementations, described herein, can provide for object location tracking. For example, a tracking device associated with an object can monitor a movement of the object to detect a deviation in the movement (e.g., a deviation from an expected continuation of the movement). Based on detecting the deviation, the tracking device can generate a data set (e.g., a data set including a location of the object and a control point associated with the location) that is used by the tracking device to update a model (e.g., a model that provides an estimated path of the object over a time period based on a plurality of data sets). The tracking device can transmit the model to a location tracking platform that is remotely located from the tracking device, and the location tracking platform can use the model to determine a particular location of the object.

In this way, data transmissions between the tracking device and the location tracking platform can be reduced. For example, a data transmission is not needed when the object is moving in a constant direction for a period of time (e.g., as is common for a vehicle traveling on an interstate). Accordingly, the object location tracking described herein conserves computing resources (e.g., processing resources, memory resources, and/or the like) and/or network resources that would otherwise be wasted by data transmissions regarding a location of an object that are provided at regular, short intervals. Furthermore, the object location tracking described herein provides for an accurate estimate of unknown intermediate locations of an object between data transmissions regarding known locations of the object. In this way, tracking accuracy can be improved, thereby reducing logistical issues associated with inaccurate data and conserving computing resources and/or network resources associated with correcting inaccurate data.

Figure 1C:
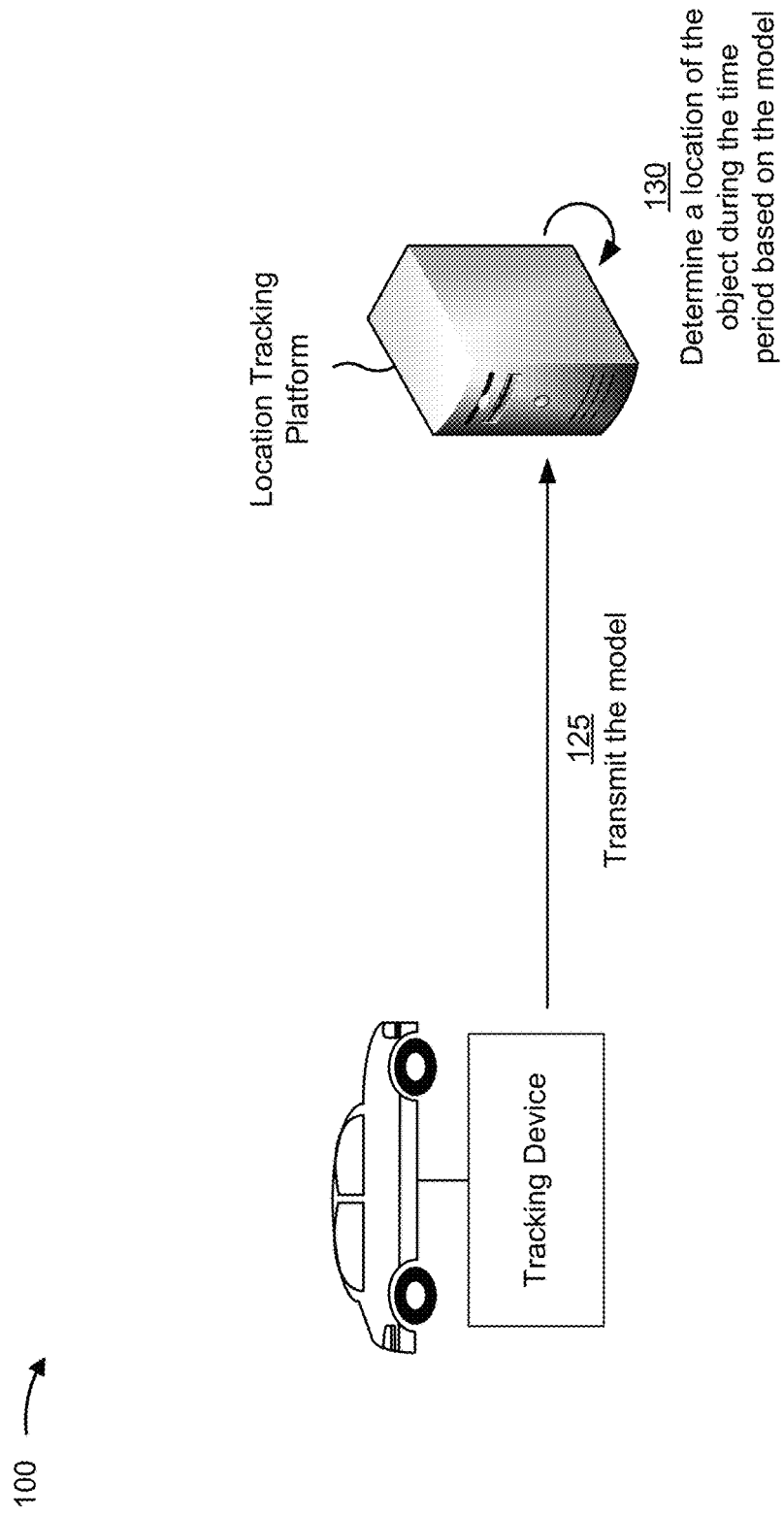

FIGS. 1A-1C are diagrams of one or more example implementations 100 described herein. As shown in FIGS. 1A-1C, example implementation(s) 100 can include a tracking device and a location tracking platform for tracking a location of an object.

For example, the tracking device (e.g., a telematics device, a user device, a vehicle "black box" device, a vehicle on-board device, a vehicle electronic control module (ECM), and/or the like) can generate and/or update a model that estimates a path of the object over a time period. The tracking device can be associated with the object. For example, the tracking device can be interconnected with the object (e.g., installed in a vehicle by providing a connection between the tracking device and a diagnostic system and/or information system of the vehicle) or provided in association with the object (e.g., attached to the object).

The tracking device can transmit the model to the location tracking platform (e.g., a location tracking platform including one or more server devices), and the location tracking platform can use the model to determine a particular location of the object during the time period. For example, the location tracking platform can use the model to determine a particular location of the object in response to a request from a user to track the object.

In some implementations, the object that is tracked by the tracking device can be a vehicle, such as a car, a truck, a motorcycle, a scooter, a bicycle, a boat, an airplane, a helicopter, etc. In some implementations, the vehicle can be part of a fleet of vehicles associated with an entity (e.g., a courier services provider, a trucking services provider, a shipping services provider, etc.). While the description to follow will be described in terms of an example of tracking a vehicle, the description is not limited to this particular example. Implementations described herein also apply to other objects that can be tracked, such as a person, an animal (e.g., a pet), a shipping container, a package, a personal item (e.g., a computer, a smartphone, a briefcase, etc.), and/or the like. Furthermore, while the description to follow will be described in terms of tracking a single object, the location tracking platform can provide location tracking for hundreds, thousands, millions, or more objects.

As shown in FIG. 1A, and by reference number 105, the tracking device can monitor a movement of the object that is being tracked. In some implementations, the movement of the object can relate to a location of the object. For example, the tracking device can monitor data (e.g., GPS information, such as GPS coordinates) relating to a location of the object over a time period. A curve-fitting algorithm (e.g., a Bézier curve algorithm) associated with the tracking device (e.g., implemented by one or more processes associated with the tracking device) can obtain the data relating to the location of the object in order to generate a curve (e.g., a curve estimating a path of the object over the time period), as described below. In some implementations, the tracking device can store, or cause another device to store, the data relating to the location of the object in a data structure (e.g., a database, a linked list, a table, and/or the like) and the curve-fitting algorithm can obtain the data from the data structure.

In some implementations, the movement of the object can relate to a movement parameter of the object. For example, the tracking device can monitor a movement parameter of the object that relates to an acceleration of the object, a speed of the object, a direction of the object, and/or the like. The movement parameter of the object can be expressed as a movement vector (e.g., a speed of the object in a direction of the object (i.e., velocity)). In some implementations, the movement of the object can relate to a status associated with the object that is indicative of movement. For example, in the case of a vehicle, the tracking device can monitor whether a driver seatbelt of the vehicle is fastened, a door of the vehicle or a trunk of the vehicle is open, a brake of the vehicle is engaged, an accelerator of the vehicle is engaged, and/or a turn signal of the vehicle is activated.

The tracking device can monitor the movement of the object based on information that is generated by a system and/or a process of the object (e.g., an on-board computer system of a vehicle that generates data relating to a location of the vehicle, a movement parameter of the vehicle, and/or a status of the vehicle) and provided to the tracking device (e.g., by a wired connection and/or a wireless technology, such as near field communication (NFC) or Bluetooth). Additionally, or alternatively, the tracking device can monitor the movement of the object based on information generated by one or more sensors associated with the tracking device (e.g., an accelerometer, a speedometer, a magnetometer, such as used with a compass, and/or the like). In some implementations, the tracking device can monitor the movement of the object based on information generated by a user device (e.g., a smartphone) associated with the object (e.g., a user device of an occupant of a vehicle) and provided to the tracking device.

As shown by reference number 110, the tracking device can detect a deviation in the movement of the object. For example, the tracking device can detect the deviation in the movement of the object using information that is generated by a system and/or a process of the object, information generated by one or more sensors associated with the tracking device, and/or information generated by a user device, as described above.

In some implementations, the tracking device can detect the deviation in the movement of the object as a deviation from an expected movement of the object. For example, if the movement of the object is a linear movement or a curvilinear movement, the tracking device can determine an expected continuation of the linear movement or the curvilinear movement, respectively, and detect a deviation from the expected continuation. For example, if a movement of a vehicle is in a direction (e.g., northwest), the tracking device can detect a deviation from an expected continuation of the vehicle in the direction (e.g., a deviation to a northeast direction). As another example, if a movement of a vehicle is following a curve (e.g., a curve determined by the curve-fitting algorithm), the tracking device can detect a deviation from an expected continuation of the vehicle following the curve.

In some implementations, the tracking device can detect a deviation from an expected movement of the object based on an acceleration of the object, a speed of the object, and/or a direction of the object. For example, the tracking device can determine an expected location of the object based on the acceleration of the object, the speed of the object, and/or the direction of the object (e.g., from a previous location). Continuing with the previous example, the tracking device can determine whether an actual location of the object (e.g., based on GPS information) deviates from the expected location of the object to thereby determine the deviation from the expected movement of the object.

In some implementations, the tracking device can determine an expected movement of the object from an output of a machine learning model that was trained on historical information relating to past movements of the object (e.g., past routes traveled by a vehicle). This can be useful when the object moves according to one or more repeating paths (e.g., a truck that regularly makes deliveries from a first location to a second location using the same route).

In some implementations, the tracking device can detect a deviation in the movement of the object based on a change to a movement parameter associated with the object. For example, the tracking device can detect a deviation in the movement of the object based on a change to an acceleration of the object, a speed of the object, a direction of the object, and/or revolutions per minute (RPM) of an engine of the object (e.g., where the object is a vehicle).

In an example of a vehicle, the tracking device can detect a deviation in the movement of the vehicle based on a status associated with the vehicle (e.g., a status indicative of the movement of the vehicle). For example, the tracking device can detect the deviation in the movement of the vehicle based on whether a driver seatbelt of the vehicle is unfastened (an indication that the vehicle is stopped), a door of the vehicle or a trunk of the vehicle is open (an indication that the vehicle is stopped), a brake of the vehicle is engaged (an indication that the vehicle is decelerating to decrease speed), an accelerator of the vehicle is engaged (an indication that the vehicle is accelerating to increase speed), whether a seat sensor detects no driver in a driver seat of the vehicle (an indication that the vehicle is stopped), and/or a turn signal of the vehicle is activated (an indication that the vehicle is changing direction).

As shown in FIG. 1B, and by reference number 115, the tracking device can generate a data set based on detecting the deviation in the movement of the object. In this way, tracking precision can be improved in some situations (e.g., when the object is frequently deviating in movement, such as frequently changing direction) while data transmissions between the tracking device and the location tracking platform can be reduced in some situations (e.g., when the object is not deviating from a movement, such as moving in a consistent direction).

In some implementations, the tracking device can generate the data set without detecting a deviation in the movement of the object. For example, the tracking device can generate the data set at regular intervals (e.g., an interval less frequent than used with current object location tracking techniques, such as every 2 minutes, every 5 minutes, etc.) if no deviation in the movement of the object is detected during an interval (e.g., when a vehicle is traveling on an interstate). This can be useful in providing near real-time tracking of the object so as to reduce information gaps regarding a location of the object.

In some implementations, the data set can relate to a location of the object (e.g., the location of the object at a time when the deviation in the movement was detected). For example, the data set can include location data relating to the location of the object (e.g., GPS coordinates of the location of the object) and a control point generated by a curve-fitting algorithm (e.g., a Bézier curve algorithm). The tracking device, using the curve-fitting algorithm, can generate the control point so as to define an estimated path between a previous location of the object, associated with a previous data set, and a location of the object associated with the data set. For example, the tracking device, using the curve-fitting algorithm, can generate the control point so as to define an estimated path of the object that is based on data relating to a location of the object over a time period (e.g., data relating to a plurality of locations of the object between the previous location of the object and the location of the object). In this way, the tracking device can determine an estimated path of the object between a first location and a second location using the data set (e.g., using the data set and a previous data set).

In some implementations, the data set can include a time parameter. For example, the time parameter can identify a time when the object is present at a location (e.g., a timestamp). As another example, the time parameter can identify an amount of time that has elapsed since the object was present at a previous location (e.g., a previous location associated with a previous data set).

In some implementations, the tracking device can generate additional data relating to the object and/or the movement of the object that can be associated with the data set (e.g., associated with a time parameter of the data set). For example, the tracking device can generate additional data relating to an acceleration of the object, a speed of the object, a direction of the object, a temperature of the object, and/or the like. In an example of a vehicle, the tracking device can generate additional data relating to a fuel level of the vehicle, a battery level of the vehicle, a tire pressure of the vehicle, RPM of an engine of the vehicle, a fluid level of the vehicle (e.g., wiper fluid, brake fluid, antifreeze, engine coolant, etc.), a malfunction indication of the vehicle (e.g., a check-engine indication), and/or the like.

In some implementations, the tracking device can generate the data set based on detecting that the deviation in the movement of the object satisfies a threshold value. In some implementations, the threshold value can represent a percentage change to a movement parameter associated with the object. For example, the tracking device can generate the data set based on detecting a percentage change (e.g., ±5%, ±10%, ±20%, etc.) in an acceleration of the object, a speed of the object, a direction of the object, RPM of an engine of the object, and/or the like. In this way, minor deviations in the movement of the object (e.g., a lane change of a vehicle) can be ignored by the tracking device to thereby further reduce data transmissions between the tracking device and the location tracking platform.

As shown by reference number 120, the tracking device can update a model with the data set. For example, the tracking device (e.g., using the curve-fitting algorithm) can update a model that was previously generated by the tracking device (e.g., using the curve-fitting algorithm) that includes at least one previous data set. Accordingly, the data set can be one of a plurality of data sets included in the model, and the model can provide an estimated path of the object over a time period based on the plurality of data sets.

In some implementations, the model can provide an estimated path of the object as a parametric equation that is based on the plurality of data sets. For example, the model can provide a Bezier curve as a parametric equation that is based on the plurality of data sets. In some implementations, a curve (e.g., a Bézier curve) can be defined by two data sets, and an estimated path of the object can be defined by a composite curve composed of a plurality of curves (e.g., a plurality of Bezier curves).

As shown by FIG. 1C, and by reference number 125, the tracking device (e.g., using a wireless communication interface) can transmit the model to the location tracking platform. For example, the tracking device can transmit the model to the location tracking platform after updating the model with the data set. In this way, the tracking device can reduce data transmissions to the location tracking platform by providing the model to the location tracking platform when the model is updated based on the deviation in the movement of the object.

In some implementations, the tracking device can transmit the model to the location tracking platform as an update to a previous model transmitted to the location tracking platform. For example, the update can include the data set generated by the tracking device and exclude one or more of a plurality of data sets previously generated by the tracking device (e.g., one or more of a plurality of data sets included in the previous model). The location tracking platform can use the update transmitted from the tracking device to assemble the model.

In some implementations, the tracking device, when transmitting the model to the location tracking platform, can transmit one or more of the additional data relating to the object and/or the movement of the object to the location tracking platform. The additional data can be associated with a data set of the model, as described above. In this way, the additional data can permit the location tracking platform to correlate useful information about the object (e.g., a battery level of a vehicle) with a particular location of the object.

As shown by reference number 130, the location tracking platform can use the model transmitted from the tracking device to determine a particular location of the object during a time period (i.e., the model can define an estimated path of the object as a function of time). Accordingly, the location tracking platform can provide a historical time (e.g., a time point or a time range) to the model, and obtain, as an output from the model, information identifying a particular location of the object, and/or one or more additional data relating to the object and/or a movement of the object, at the historical time. For example, in response to a request that includes a historical time (e.g., a request from a user of the location tracking platform), the location tracking platform can provide the historical time to the model, and obtain, as an output from the model, information identifying a particular location of the object at the historical time. Continuing with the previous example, the location tracking platform can respond to the request with the information identifying the particular location of the object.

In some implementations, the location tracking platform can provide a user interface (e.g., a graphical user interface) that permits a user device of a user to access the location tracking platform and obtain information identifying a particular location of the object and/or additional data relating to the object and/or the movement of the object. In some implementations, the user interface can be a graphical display that permits the user to observe a particular location of the object in connection with a map in near real-time. For example, the particular location of the object (e.g., GPS coordinates) can be graphically correlated to a map (e.g., a map that includes the particular location of the object) and displayed on the user device.

In some implementations, the location tracking platform can transmit information and/or instructions to the tracking device, or another device associated with the object, based on the particular location of the object and/or the additional data relating to the object and/or the movement of the object. In an example of a vehicle, the location tracking platform can transmit traffic information (e.g., based on a location of the vehicle), service station information (e.g., based on a location of the vehicle and a fuel level of the vehicle), and/or the like to the tracking device, or another device associated with the vehicle.

As indicated above, FIGS. 1A-1C are provided as examples. Other examples can differ from what is described with regard to FIGS. 1A-1C.

Figure 2:
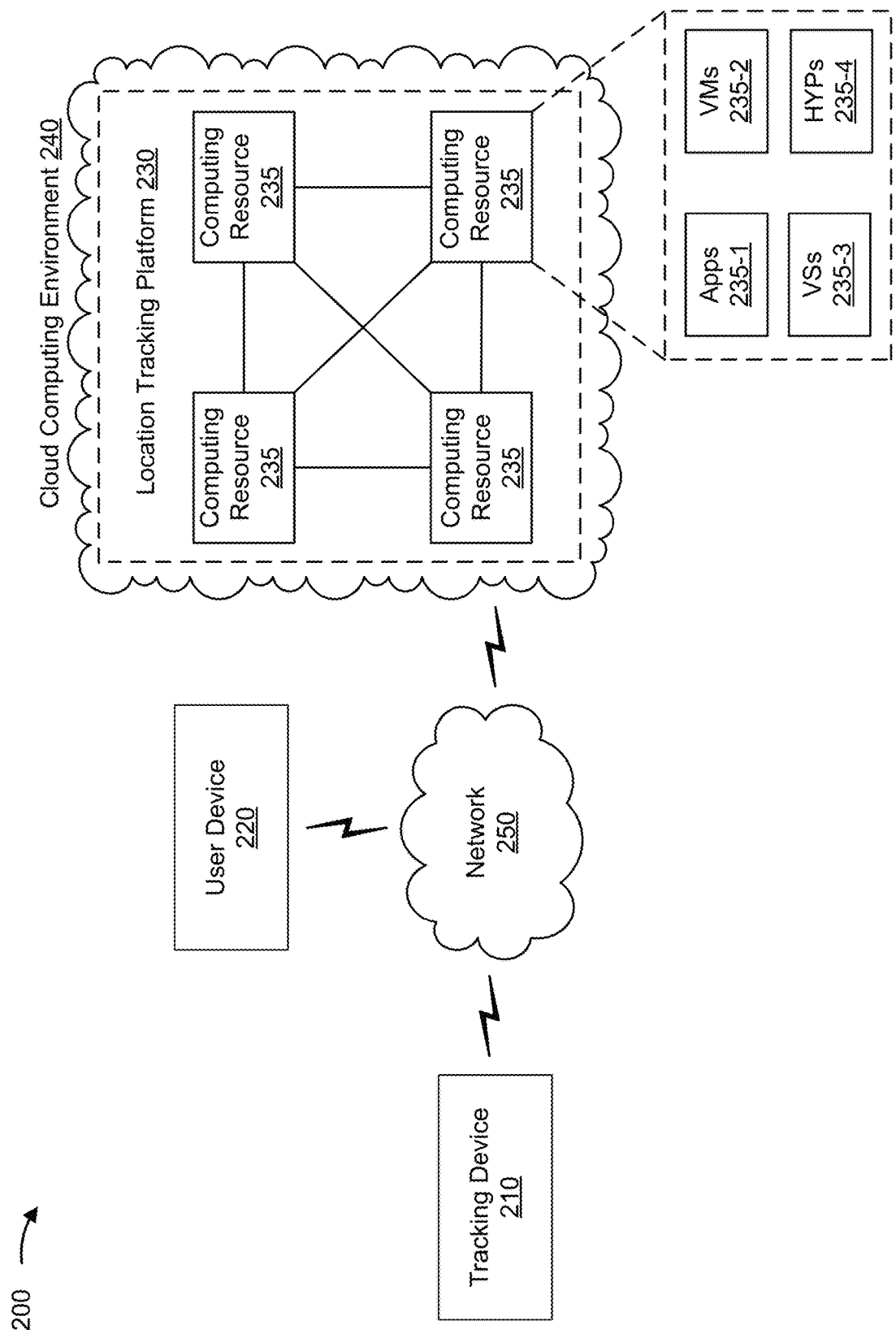
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a tracking device 210, a user device 220, a location tracking platform 230, a computing resource 235, a cloud computing environment 240, and a network 250. Devices of environment 200 can interconnect via wired connections, wireless connections, or a combination of wired and wireless connections.

Tracking device 210 includes one or more devices (e.g., electronic devices) capable of wireless communication (e.g., cellular communication), such as a telecommunication device. For example, tracking device 210 can include a computing device associated with a GPS, a modem, and/or a radio transceiver (e.g., a telematics device, a smartphone, a tablet computer, a handheld computer, a radiotelephone, a vehicle "black box" device, a vehicle on-board device, a vehicle ECM, etc.), or a similar device capable of performing location and/or communication functions. In some implementations, tracking device 210 can be associated with an object (e.g., a vehicle, a person, an animal, a shipping container, a package, a personal item, etc.). In some implementations, tracking device 210 can receive information from, and/or transmit information to, location tracking platform 230.

User device 220 includes one or more devices capable of receiving, generating, storing, processing, and/or providing information associated with object location tracking. For example, user device 220 can include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Location tracking platform 230 includes one or more computing resources associated with tracking a location of an object. For example, location tracking platform 230 can be a platform implemented by cloud computing environment 240 that can obtain a model (e.g., assemble the model from an update to the model) that provides an estimated path of an object over a time period and use the model to determine a particular location of the object during the time period. In some implementations, location tracking platform 230 is implemented by computing resources 235 of cloud computing environment 240.

Location tracking platform 230 can include a server device or a group of server devices. In some implementations, location tracking platform 230 can be hosted in cloud computing environment 240. Notably, while implementations described herein describe location tracking platform 230 as being hosted in cloud computing environment 240, in some implementations, location tracking platform 230 can be non-cloud-based or can be partially cloud-based.

Cloud computing environment 240 includes an environment that delivers computing as a service, whereby shared resources, services, etc. can be provided to tracking device 210, user device 220, and/or the like. Cloud computing environment 240 can provide computation, software, data access, storage, and/or other services that do not require end-user knowledge of a physical location and configuration of a system and/or a device that delivers the services. As shown, cloud computing environment 240 can include location tracking platform 230 and computing resource 235.

Computing resource 235 includes one or more personal computers, workstation computers, server devices, or another type of computation and/or communication device. In some implementations, computing resource 235 can host location tracking platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by tracking device 210 and/or user device 220. Application 235-1 can eliminate a need to install and execute the software applications on tracking device 210 and/or user device 220. For example, application 235-1 can include software associated with location tracking platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program and can support a single process. In some implementations, virtual machine 235-2 can execute on behalf of a user (e.g., tracking device 210 and/or user device 220), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200. For example, location tracking platform 230 can perform one or more functions described as being performed by tracking device 210 and/or tracking device 210 can perform one or more functions described as being performed by location tracking platform 230.

Figure 3:
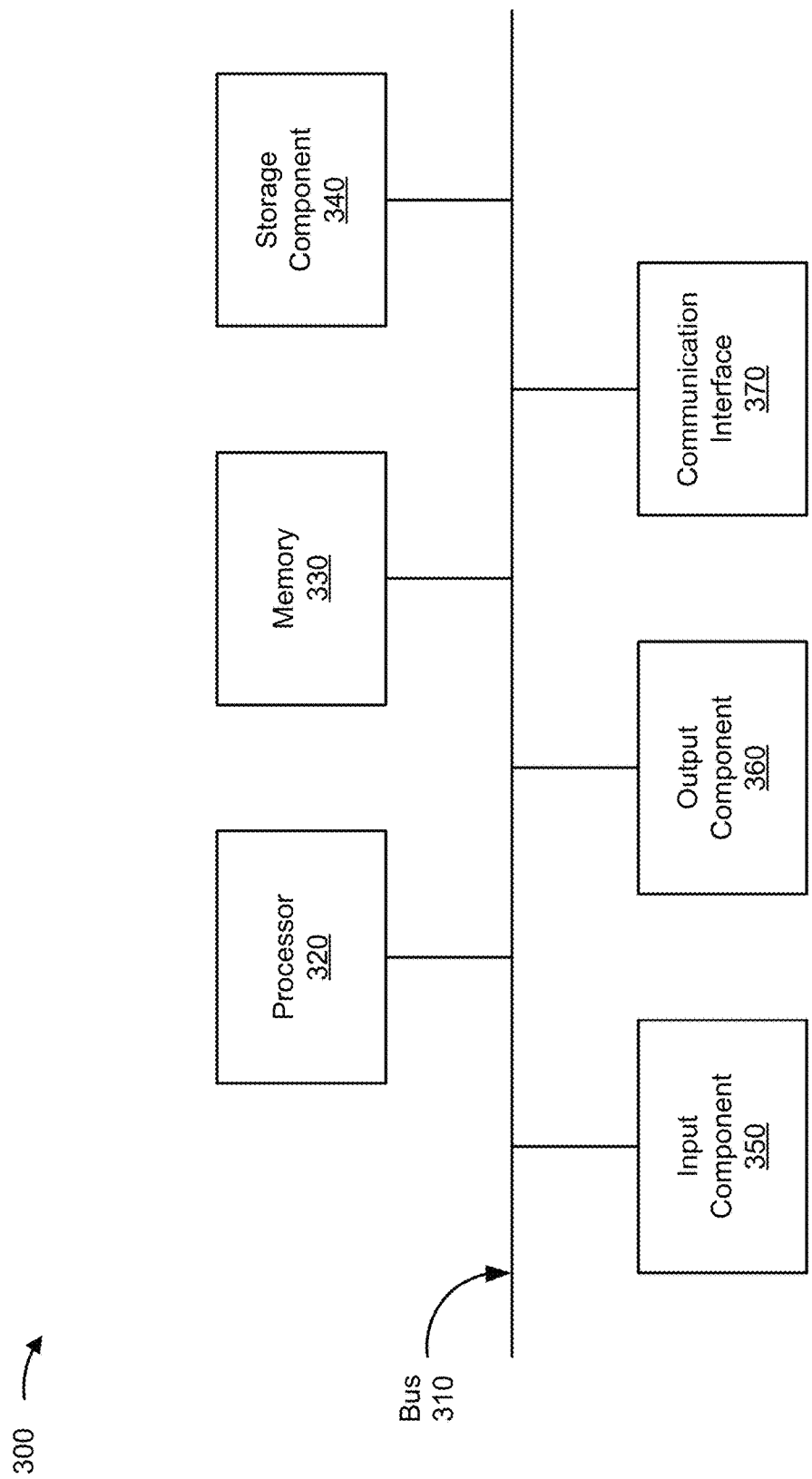
FIG. 3 is a diagram of example components of one or more devices of FIG. 2.

FIG. 3 is a diagram of example components of a device 300. Device 300 can correspond to tracking device 210, user device 220, location tracking platform 230, and/or computing resource 235. In some implementations tracking device 210, user device 220, location tracking platform 230, and/or computing resource 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a GPS component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
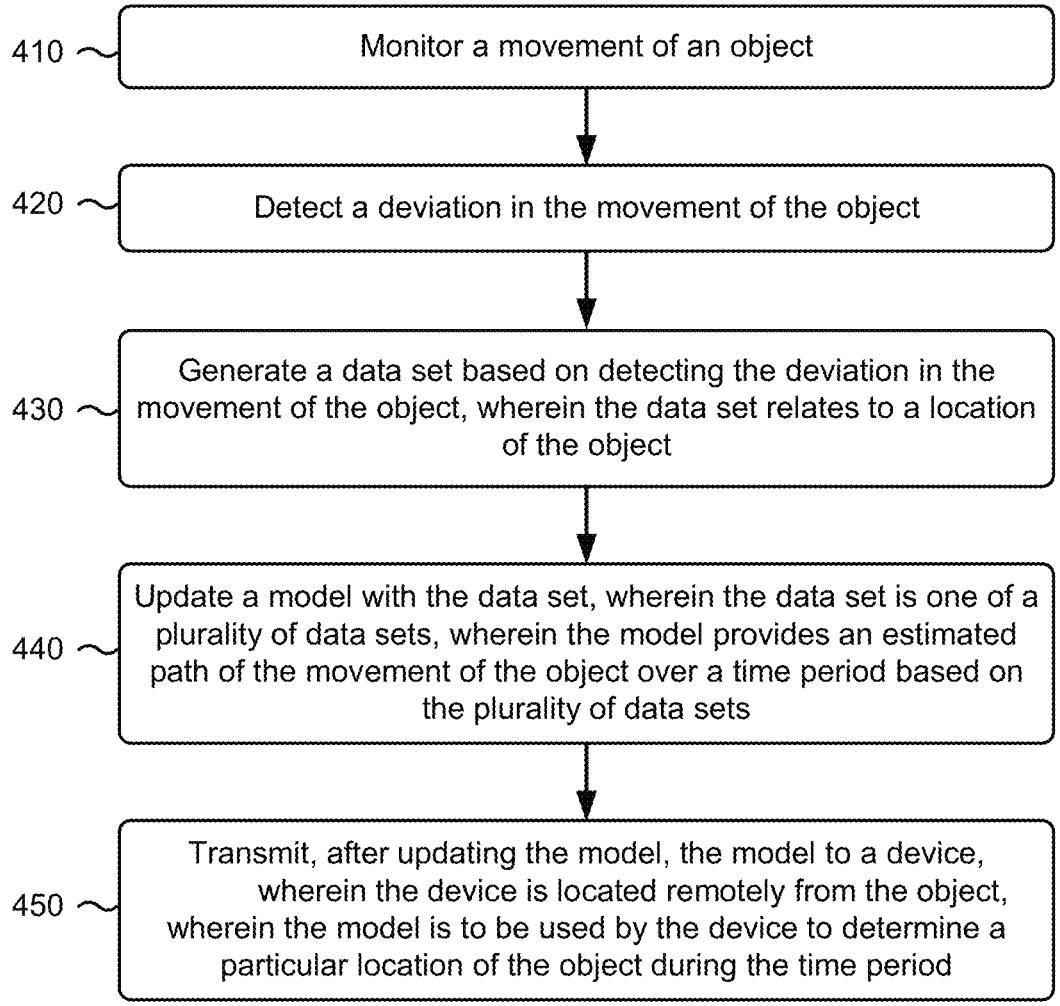
FIG. 4 is a flow chart of an example process for object location tracking.

FIG. 4 is a flow chart of an example process 400 for object location tracking. In some implementations, one or more process blocks of FIG. 4 can be performed by a tracking device (e.g., tracking device 210). In some implementations, one or more process blocks of FIG. 4 can be performed by another device or a group of devices separate from or including the tracking device, such as a user device (e.g., user device 220), a location tracking platform (e.g., location tracking platform 230), and/or the like.

As shown in FIG. 4, process 400 can include monitoring a movement of an object (block 410). For example, the tracking device (e.g., using processor 320, memory 330, storage component 340, input component 350, and/or the like) can monitor a movement of an object, as described above.

As further shown in FIG. 4, process 400 can include detecting a deviation in the movement of the object (block 420). For example, the tracking device (e.g., using processor 320, memory 330, storage component 340, input component 350, and/or the like) can detect a deviation in the movement of the object, as described above.

As further shown in FIG. 4, process 400 can include generating a data set based on detecting the deviation in the movement of the object, wherein the data set relates to a location of the object (block 430). For example, the tracking device (e.g., using processor 320, memory 330, storage component 340, and/or the like) can generate a data set based on detecting the deviation in the movement of the object, as described above. In some implementations, the data set relates to a location of the object.

As further shown in FIG. 4, process 400 can include updating a model with the data set, wherein the data set is one of a plurality of data sets, and wherein the model provides an estimated path of the movement of the object over a time period based on the plurality of data sets (block 440). For example, the tracking device (e.g., using processor 320, memory 330, storage component 340, and/or the like) can update a model with the data set, as described above. In some implementations, the data set is one of a plurality of data sets. In some implementations, the model provides an estimated path of the movement of the object over a time period based on the plurality of data sets.

As further shown in FIG. 4, process 400 can include transmitting the model to a device, wherein the device is located remotely from the object, and wherein the model is to be used by the device to determine a particular location of the object during the time period (block 450). For example, the tracking device (e.g., using processor 320, memory 330, storage component 340, output component 360, communication interface 370, and/or the like) can transmit the model to a device, as described above. In some implementations, the device is located remotely from the object. In some implementations, the model is to be used by the device to determine a particular location of the object during the time period.

Process 400 can include additional implementations, such as any single implementation or any combination of implementations described below and/or in connection with one or more other processes described elsewhere herein.

In some implementations, the tracking device can generate the data set based on detecting that the deviation in the movement of the object satisfies a threshold value. In some implementations, the data set includes location data relating to the location of the object and a control point generated by a curve-fitting algorithm.

In some implementations, the model is a Bézier curve model. In some implementations, when transmitting the model to the device, the tracking device can transmit an update to the model to the device, where the update includes the data set and excludes one or more of the plurality of data sets.

In some implementations, the object is a vehicle and the deviation in the movement of the vehicle relates to a change to one or more of an acceleration of the vehicle, a speed of the vehicle, a direction of the vehicle, a revolutions per minute (RPM) of an engine of the vehicle, or a status associated with the vehicle. In some implementations, the object is a vehicle and the deviation in the movement of the vehicle relates to a change to a status associated with the vehicle that relates to one or more of whether a driver seatbelt of the vehicle is fastened, whether a door of the vehicle or a trunk of the vehicle is open, whether a brake of the vehicle is engaged, whether an accelerator of the vehicle is engaged, or whether a turn signal of the vehicle is activated.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   monitoring, by a vehicle on-board device, a movement of an object over a time period;
   detecting, by the vehicle on-board device, a deviation in the movement of the object during the time period;
   generating, by the vehicle on-board device, a data set based on detecting the deviation in the movement of the object,
      wherein the deviation is detected based on detecting a status change in the object,
      wherein the data set relates to a location of the object, and
      wherein a rate of data transmission to generate the data set is adjusted based on a rate of deviations detected by the vehicle on-board device;
   updating, by the vehicle on-board device, a machine learning model with the data set,
      wherein the data set is one of a plurality of data sets that includes a previous data set, relating to past movements of the object,
         wherein the machine learning model is trained based on the previous data set and provides an estimated past path of the movement of the object over the time period based on the plurality of data sets; and
   transmitting, by the vehicle on-board device and after updating the machine learning model, the machine learning model to a second device,
      wherein the second device is located remotely from the object, and
      wherein the machine learning model is to be used by the second device to determine a particular previous location of the object during the time period.

2. The method of claim 1, wherein generating the data set comprises:
   generating the data set based on detecting that the deviation in the movement of the object satisfies a threshold value.

3. The method of claim 1, wherein the data set includes location data relating to the location of the object and a control point generated by a curve-fitting algorithm.

4. The method of claim 1, wherein the machine learning model provides the estimated past path of the movement as a Bézier curve.

5. The method of claim 1, wherein transmitting the machine learning model to the second device comprises:
   transmitting an update of the machine learning model to the second device,
      wherein the update includes the data set and excludes one or more of the plurality of data sets.

6. The method of claim 1, wherein detecting the deviation in the movement of the object is based on a status of the object that is indicative of the movement of the object.

7. The method of claim 6, wherein the object is a vehicle, and
   wherein the status of the object that is indicative of the movement of the object relates to one or more of:
      whether a driver seatbelt of the vehicle is unfastened,
      whether a door of the vehicle or a trunk of the vehicle is open,
      whether a brake of the vehicle is engaged,
      whether an accelerator of the vehicle is engaged, or
      whether a turn signal of the vehicle is activated.

8. The method of claim 1, further comprising:
   generating, by the vehicle on-board device and after a second time period without the deviation in the movement of the object, a second data set relating to a second movement of the object,
      wherein the plurality of data sets includes the previous data set, the data set, and the second data set.

9. A vehicle on-board device, comprising:
   one or more memories; and
   one or more processors, coupled to the one or more memories, to:
      monitor a movement of an object;
      detect a deviation in the movement of the object,
         wherein the deviation is detected based on detecting a status change in the object;
      generate a data set based on detecting the deviation in the movement of the object, wherein the data set relates to a location of the object, and wherein a rate of data transmission to generate the data set is adjusted based on a rate of deviations detected by the vehicle on-board device;

update a machine learning model with the data set, wherein the data set is one of a plurality of data sets that includes a previous data set, relating to past movements of the object;

wherein the machine learning model is trained based on the previous data set and provides an estimated past path of the movement of the object over a time period based on the plurality of data sets; and transmit the machine learning model to a second device, wherein the second device is located remotely from the object, wherein the machine learning model is to be used by the second device to determine a particular previous location of the object during the time period.

10. The vehicle on-board device of claim 9, wherein the data set includes location data relating to the location of the object and a control point generated by a curve-fitting algorithm.

11. The vehicle on-board device of claim 9, wherein the machine learning model provides the estimated past path of the movement as a Bézier curve.

12. The vehicle on-board device of claim 9, wherein the one or more processors, when transmitting the machine learning model to the second device, are to:

transmit an update of the machine learning model to the second device, wherein the update includes the data set and excludes one or more of the plurality of data sets.

13. The vehicle on-board device of claim 9, wherein detecting the deviation in the movement of the object is based on a status of the object that is indicative of the movement of the object.

14. The vehicle on-board device of claim 13, wherein the object is a vehicle, and wherein the status of the object that is indicative of the movement of the object relates to one or more of:
whether a driver seatbelt of the vehicle is unfastened,
whether a door of the vehicle or a trunk of the vehicle is open,
whether a brake of the vehicle is engaged,
whether an accelerator of the vehicle is engaged, or
whether a turn signal of the vehicle is activated.

15. The vehicle on-board device of claim 9, wherein the one or more processors, when generating the data set, are to:
generate the data set based on detecting that the deviation in the movement of the object satisfies a threshold value.

16. A non-transitory computer-readable medium storing instructions, the instructions comprising:
one or more instructions that, when executed by one or more processors of a vehicle on-board device, cause the one or more processors to:
monitor a movement of an object;
detect a deviation in the movement of the object,
wherein the deviation is detected based on detecting a status change in the object;
generate a data set based on detecting the deviation in the movement of the object,
wherein the data set relates to a location of the object, and
wherein a rate of data transmission to generate the data set is adjusted based on a rate of deviations detected by the vehicle on-board device;
update a machine learning model with the data set,
wherein the data set is one of a plurality of data sets that includes a previous data set relating to past movements of the object,
wherein the machine learning model is trained based on the previous data set and provides an estimated past path of the movement of the object over a time period based on the plurality of data sets; and
transmit the machine learning model to a second device,
wherein the second device is located remotely from the object,
wherein the machine learning model is to be used by the second device to determine a particular previous location of the object during the time period.

17. The non-transitory computer-readable medium of claim 16, wherein the data set includes location data relating to the location of the object and a control point generated by a curve-fitting algorithm.

18. The non-transitory computer-readable medium of claim 16, wherein the one or more instructions, that cause the one or more processors to generate the data set, cause the one or more processors to:
generate the data set based on detecting that the deviation in the movement of the object satisfies a threshold value.

19. The non-transitory computer-readable medium of claim 16, wherein the one or more instructions, that cause the one or more processors to transmit the machine learning model to the second device, cause the one or more processors to:
transmit an update of the machine learning model to the second device,
wherein the update includes the data set and excludes one or more of the plurality of data sets.

20. The non-transitory computer-readable medium of claim 16, wherein detecting the deviation in the movement of the object is based on a status of the object that is indicative of the movement of the object.

* * * * *